US010502290B2

(12) United States Patent
Gilbert

(10) Patent No.: US 10,502,290 B2
(45) Date of Patent: *Dec. 10, 2019

(54) DRIVE MEMBER FOR HAIR TRIMMER

(71) Applicant: ANDIS COMPANY, Sturtevant, WI (US)

(72) Inventor: Steven J. Gilbert, Menomonee Falls, WI (US)

(73) Assignee: Andis Company, Sturtevant, WI (US)

( * ) Notice: Subject to any disclaimer, the term of this patent is extended or adjusted under 35 U.S.C. 154(b) by 693 days.

This patent is subject to a terminal disclaimer.

(21) Appl. No.: 15/012,678

(22) Filed: Feb. 1, 2016

(65) Prior Publication Data

US 2016/0146316 A1   May 26, 2016

Related U.S. Application Data

(63) Continuation of application No. 13/555,514, filed on Jul. 23, 2012, now Pat. No. 9,248,577.

(51) Int. Cl.
*F16H 21/16* (2006.01)
*B26B 19/28* (2006.01)

(52) U.S. Cl.
CPC .............. *F16H 21/16* (2013.01); *B26B 19/28* (2013.01)

(58) Field of Classification Search
CPC ......... F16H 21/16; B26B 19/28; B26B 19/32; B26B 19/36
USPC .................................. 30/208–222; 264/242
See application file for complete search history.

(56) References Cited

U.S. PATENT DOCUMENTS

| 4,542,585 | A | | 9/1985 | Ito et al. | |
| 5,088,200 | A | * | 2/1992 | Piwaron | B26B 19/06 30/216 |
| 5,092,048 | A | | 3/1992 | Sukow et al. | |
| 5,325,590 | A | * | 7/1994 | Andis | B26B 19/28 30/216 |
| 7,624,506 | B2 | * | 12/2009 | Melton | B26B 19/28 30/210 |
| 9,248,577 | B2 | * | 2/2016 | Gilbert | F16H 21/16 |
| 2006/0260142 | A1 | * | 11/2006 | Dombrowski | B26B 21/38 30/526 |

FOREIGN PATENT DOCUMENTS

| CN | 102470534 | 5/2012 |
| CN | 102528831 | 7/2012 |
| DE | 2117319 | 10/1972 |
| DE | 10302998 | 8/2004 |

OTHER PUBLICATIONS

State Intellectual Property Office of the People's Republic of China, "First Office Action and Search Report," issued in Chinese Application No. 201310384134.3, dated Dec. 18, 2014, 19 pages.

* cited by examiner

*Primary Examiner* — Laura M Lee

(74) *Attorney, Agent, or Firm* — Reinhart Boerner Van Deuren s.c.

(57) ABSTRACT

A drive for a hair trimmer include a transmission having a cam follower coupled to a drive lever by a bridge member, and a hinge having a mounting structure coupled to a first end of a plurality of webs, and a cross-bar coupled to a second end of the plurality of webs. A portion of the cross-bar encloses the bridge member to connect the transmission and the hinge.

7 Claims, 5 Drawing Sheets

DRIVE MEMBER FOR HAIR TRIMMER

CROSS-REFERENCE TO RELATED APPLICATIONS

This application claims priority as a continuation of U.S. patent application Ser. No. 13/555,514, filed on Jul. 23, 2012, the contents of which is hereby incorporated by reference in its entirety.

BACKGROUND

The present invention relates to a drive member for a hair trimmer and a method for manufacturing the same.

SUMMARY

In one embodiment, the invention provides a trimmer comprising: a trimmer body; a rotary drive within the body; a cutting head assembly interconnected with the trimmer body; and a drive operably interconnecting the rotary drive and the cutting head assembly, to transfer rotary movement of the rotary drive into oscillation of a portion of the cutting head assembly with respect to another portion of the cutting head assembly, the drive including an injection molded transmission and an injection molded hinge; wherein the transmission includes a cam follower that is driven by the rotary drive, and a drive lever that engages a portion of the cutting head assembly; wherein the hinge includes a mounting structure for mounting the drive to the trimmer body and a plurality of webs supporting the transmission for oscilliatory movement; and wherein one of the transmission and hinge is injection molded over a portion of the other to mechanically bond the transmission and hinge.

In some embodiments, the hinge and transmission are constructed of materials having the substantially the same melting temperature, allowing the hinge and transmission to be molded at the same mold temperature. In some embodiments, the hinge is made of polypropylene and the transmission is made of glass-filled polypropylene. In some embodiments, the hinge and transmission are molded in the same mold at a temperature of about 130° F.

The invention also provides a method of manufacturing a drive for use in a trimmer that includes a rotary drive and a cutting head assembly, the drive transmitting rotary motion from the rotary drive into reciprocation of a portion of the cutting head assembly, the method comprising: injection molding a transmission within an injection molding die; injection molding a hinge within the same injection molding die; and mechanically bonding the transmission and hinge by injection molding one of the transmission and hinge over a portion of the other.

In some embodiments, the step of injection molding the transmission includes injection molding the transmission at a first mold temperature within the die; and wherein injection molding the hinge includes injection molding the hinge substantially at the first mold temperature. In some embodiments, injection molding the transmission includes injection molding a first material to form the transmission; and injection molding the hinge includes injection molding a second material to form the hinge, the second material being different from the first material but having a substantially similar melting temperature. In some embodiments, injection molding the transmission includes injection molding glass-filled polypropylene to form the transmission; and injection molding the hinge includes injection molding polypropylene to form the hinge. In some embodiments, both injection molding the transmission and injection molding the hinge include holding the mold temperature at about 130° F.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The present invention provides a drive member for a hair trimmer. The drive member can replace known drive members, such as that disclosed in U.S. Pat. No. 5,325,590. The entire disclosure of U.S. Pat. No. 5,325,590 is incorporated by reference into this specification.

Figure 1:
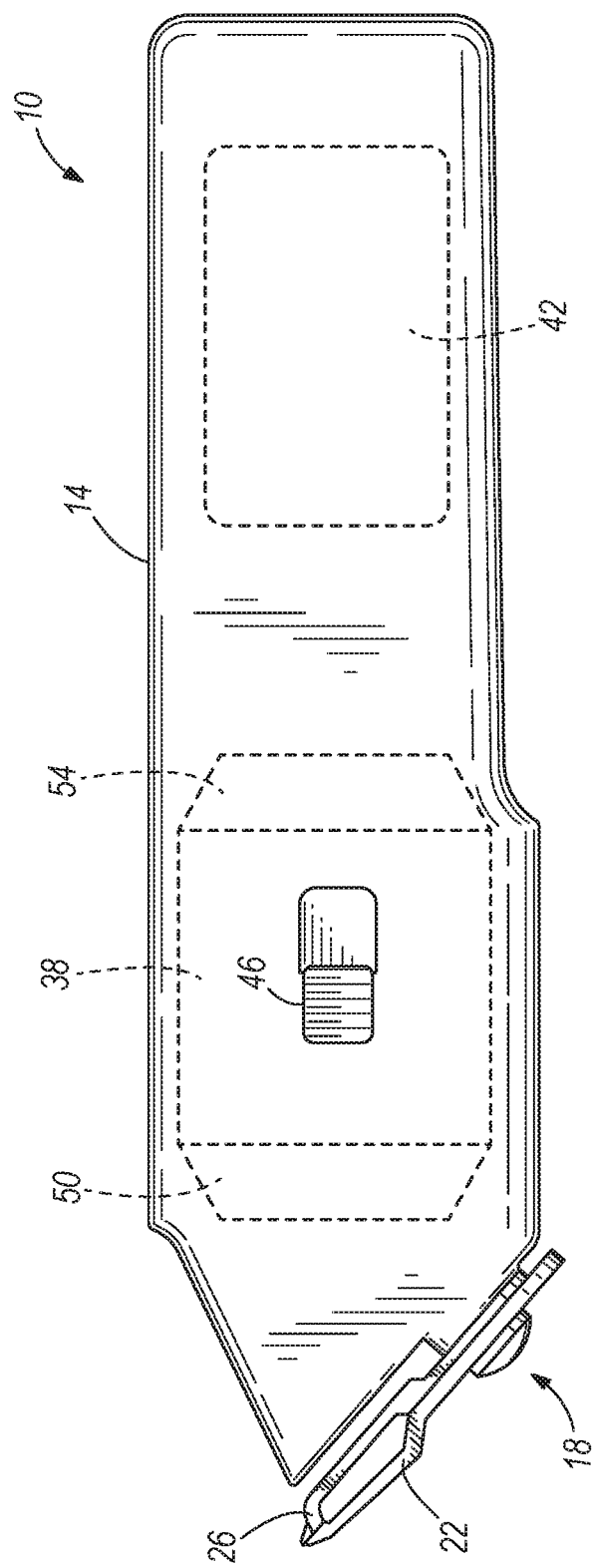
FIG. 1 is a side elevation view of an electric hair trimmer embodying the invention.

FIG. 1 is taken from U.S. Pat. No. 5,325,590, and illustrates an electric hair trimmer 10 having an easily hand-held body 14. Preferably, the body 14 is made of a light-weight, rigid plastic and is generally hollow. The trimmer 10 includes a cutting head assembly 18 that is fixed to the body 14 by a fastener. The invention can also be applied to trimmers having a removable cutting head assembly 18. U.S. Pat. No. 5,092,048, which issued on Mar. 3, 1992 to Sukow et al., illustrates one such removable cutting head assembly. The cutting head assembly 18 includes a lower plate 22 and an upper plate or cutter 26 which is supported on the lower plate 22 and which is movable with respect to the lower plate 22. The cutter 26 defines a drive socket which receives a reciprocating or oscillating drive mechanism.

The trimmer 10 also includes rotary drive means housed by the body 14 for reciprocating the cutter 26. While various constructions could be successfully employed, the illustrated rotary drive includes an electric motor 38 which is housed by the trimmer body 14 and which is operably connected to a suitable source of electric current 42. In FIG. 1, the source of current 42 is schematically represented by a battery. However, the electric motor 38 could also be connected by an electric cord extending from the body 14 to a suitable source of power. A user operable thumb switch 46 for turning the electric motor 38 "on" and "off" extends from the trimmer body 14. The rotary drive also includes a front motor frame 50 and a rear motor frame 54, each of which are fixed respectively to the front and rear ends of the electric motor 38 and which are fixed to the body 14. The front motor frame 50 secures the electric motor 38 to the body 14.

Figure 2:
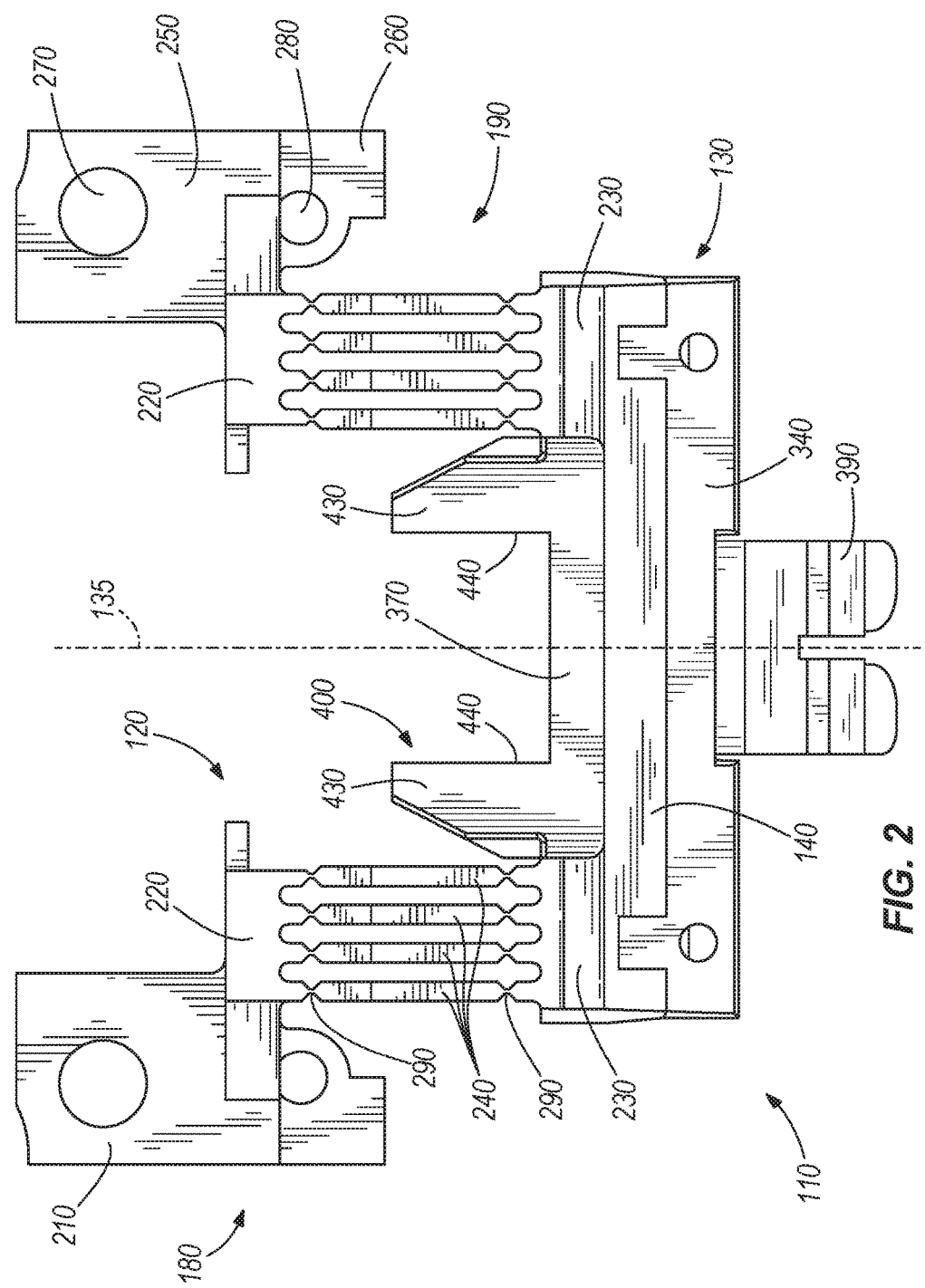
FIG. 2 is a top view of a drive for the trimmer.

FIG. 2 illustrates a drive member 110 which interconnects the rotary drive to the cutting head assembly 18. The drive member 110 includes two parts: a hinge 120 and a transmission 130. The hinge 120 mounts to the trimmer body 14. A rear portion of the transmission 130 is engaged by the rotary drive and a front portion of the transmission 130 is interconnected with the cutter 26. The transmission 130 transfers reciprocating movement from the rotary drive to the cutter 26 to create an oscillating, shearing action between the cutter and the lower plate 22. The transmission 130 is supported for such reciprocating movement by the hinge 120.

Both the hinge 120 and the transmission 130 are injection-molded components. Each of the hinge 120 and transmission 130 are formed with a single injection-molding shot. In the manufacturing process, the transmission 130 is formed with a first injection-molding shot and the hinge 120 is injection molded over the transmission 130 with a second injection-molding shot. As a result, portions of the hinge 120 take their shape as a result of molding around portions of the transmission 130. Both parts 120, 130 include various portions which are illustrated in the drawings and which will be described below. All portions of the hinge 120 are injection molded integrally with the other portions of the hinge 120, and all portions of the transmission 130 are injection molded integrally with the other portions of the transmission 130. The drive member 110 as a whole, as well as the hinge 120 and transmission 130 as separate parts, is symmetrical about a vertical plane that contains an axis of symmetry 135.

Figure 3:
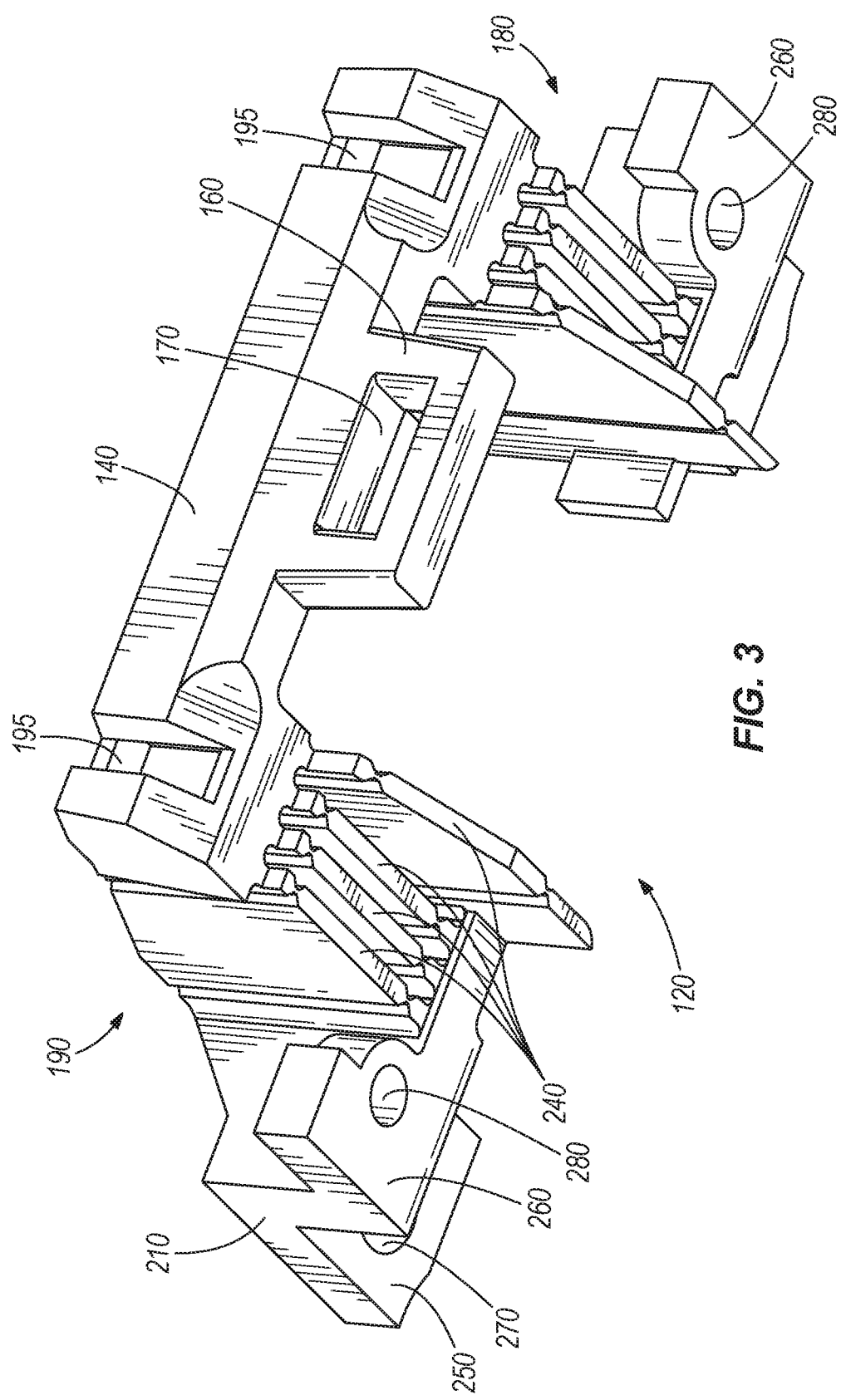
FIG. 3 is a perspective view of a hinge portion of the drive.
Figure 4:
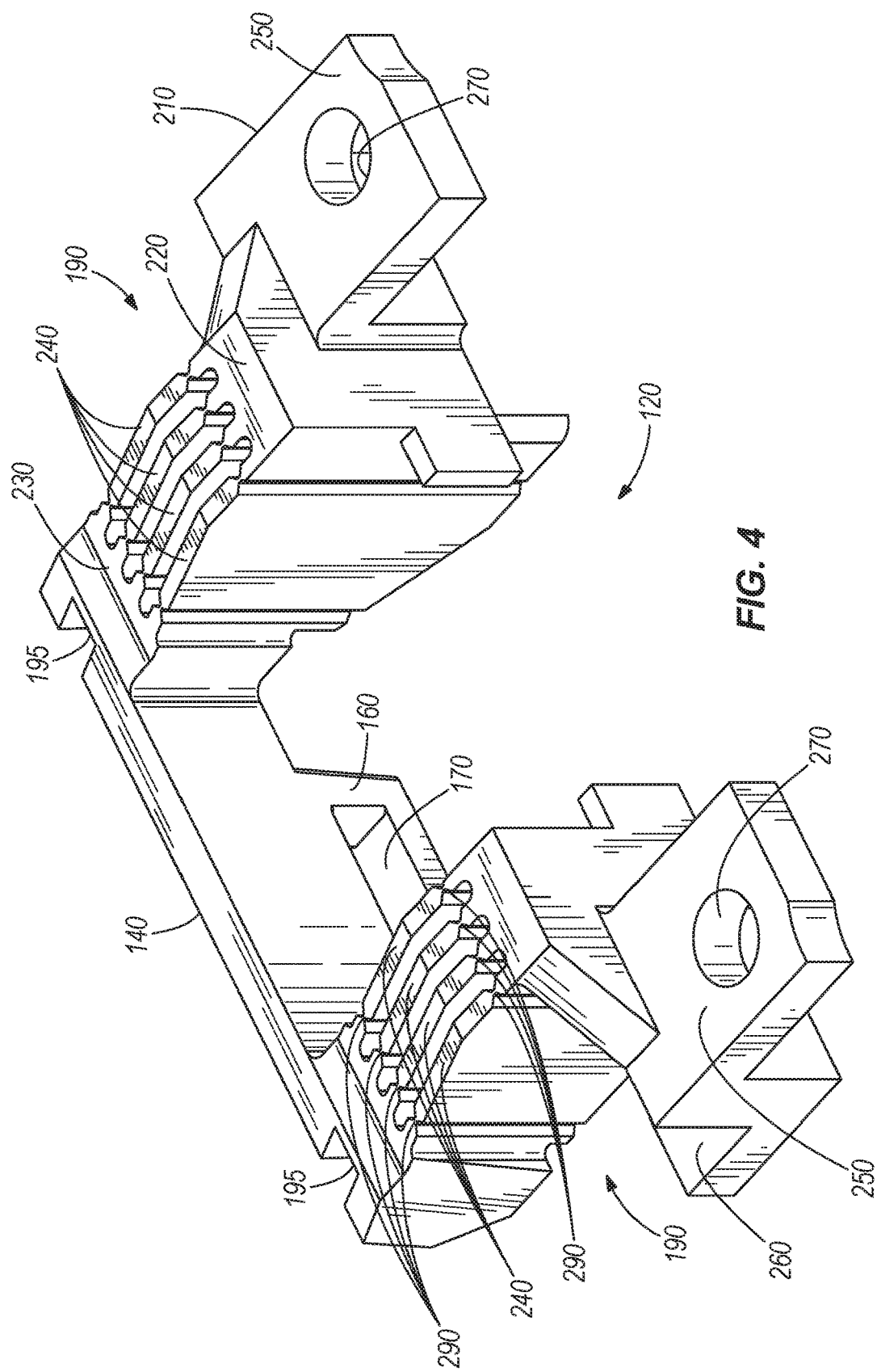
FIG. 4 is another perspective view of the hinge portion.

With reference to FIGS. 3 and 4, the hinge 120 includes a cross-bar 140, a window frame 160 depending from the cross-bar 140, a window 170 defined within the window frame 160, a left side support 180, and a right side support 190. The cross-bar 140 includes a pair of vertical slots 195, one at each of the left and right ends. The left and right side supports 180, 190 are mirror images of each other. Each side support 180, 190 includes a z-shaped mounting structure 210, a first base plate 220, a second base plate 230, and four webs 240 extending between the first and second base plates 220, 230.

The z-shaped mounting structure 210 includes an upper flange 250 and a lower flange 260. The upper flange 250 includes a hole 270 and the lower flange includes a hole 280. When installed on the body of the hair trimmer, a pair of rigid posts extend into the holes 280 in the right and left mounting structures 210 and a pair fasteners extend through the holes 270 and are threaded into a threaded hole in the body of the trimmer, to secure the hinge 120 to the body.

The four webs 240 are parallel to each other, with space in between. Each end of the webs 240 (i.e., where each web 240 joins to one of the base plates 220, 230) includes a thin neck 290 to facilitate side-to-side pivoting of the cross-bar 140 and base members 230 with respect to the base members 220.

Figure 5:
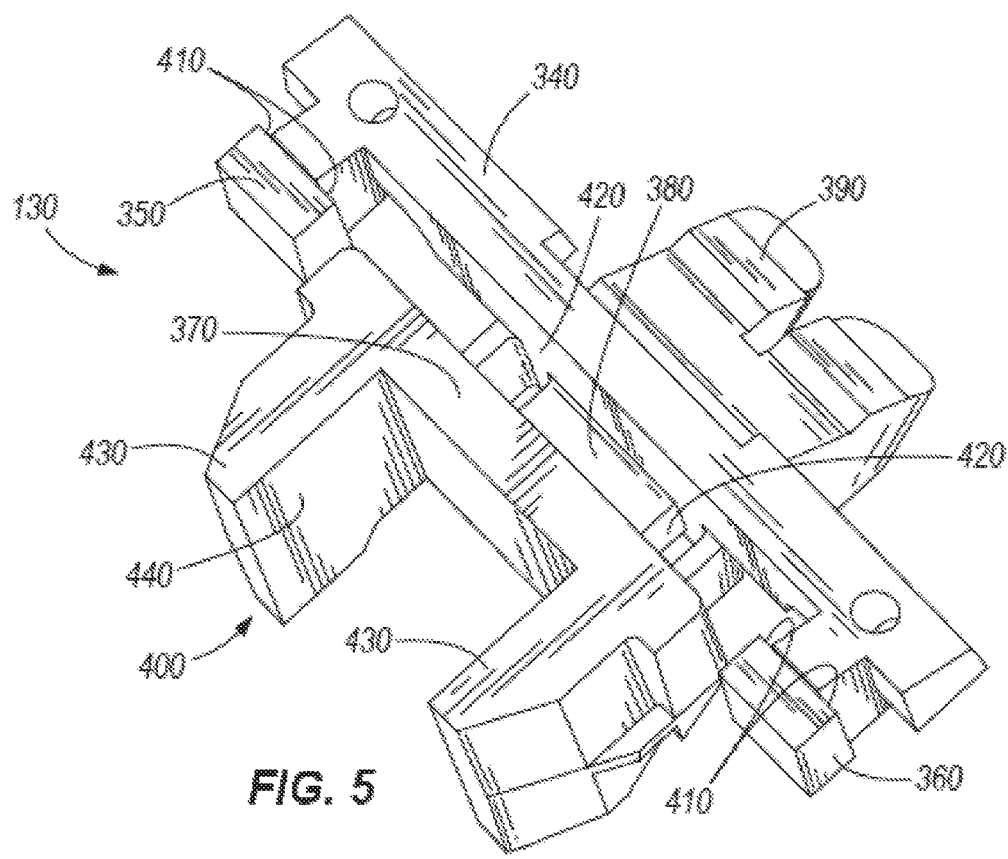
FIG. 5 is a perspective view of a transmission portion of the drive.
Figure 6:
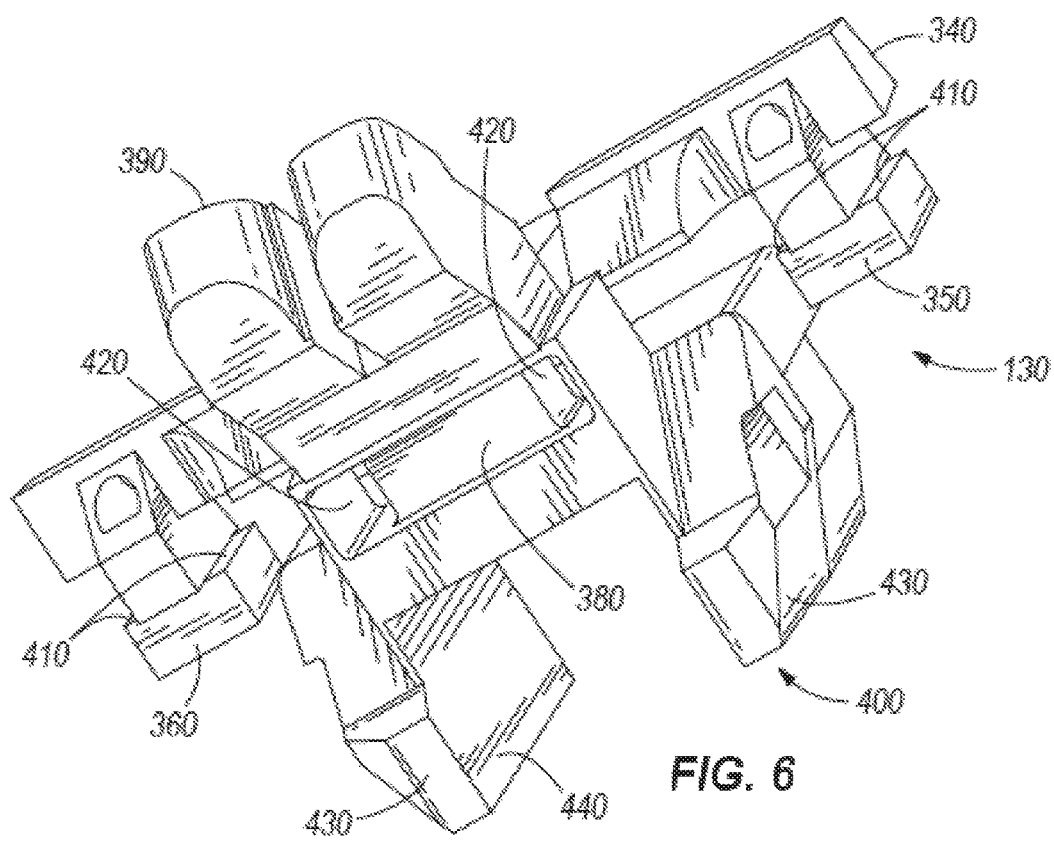
FIG. 6 is another perspective view of the transmission.

Referring to FIGS. 5 and 6, the transmission 130 includes a front plate 340, a left anchor 350, a right anchor 360, a rear plate 370, a bridge 380, a drive lever 390, and a cam follower 400. The left and right anchors 350, 360 extend rearward of the front plate 340 near the left and right ends, and define forward-facing shoulders 410 that face back to the front plate 340. The left and right anchors 350, 360 may be termed "T-shaped" because their cross-sections are so shaped. The bridge 380 interconnects the front and rear plates 340, 370, and defines a pair of apertures 420. The drive lever 390 extends forward and down from the front plate 340 and engages the cutter 26 of the cutting head assembly 18 of the trimmer 10.

The cam follower 400 includes a pair of cam walls 430 extending rearward from the rear plate 370. Each cam wall 430 defines a cam follower surface 440. The cam follower surfaces 440 define between them a vertical slot. The cam follower 400 receives a cam that is eccentrically-mounted on an output shaft of the electric motor 38. As the motor shaft rotates, the cam member orbits the axis of rotation of the motor shaft. The orbital movement of the cam is translated into left and right movement of the drive member 110 by the cam bearing on the cam follower surfaces 440. Left and right movement of the drive member 110 is imparted to the cutting head assembly 18 through the drive lever 390, which results in a shearing action in the cutting head assembly 18.

The drive member 110 is manufactured by first injection molding the transmission 130 within an injection molding die in a first shot. The hinge 120 is then injection molded over the transmission 130 in a second shot within the same injection molding die. As the hinge 120 is injection molded, the cross-bar 140 of the hinge molds around the left anchor 350, right and anchor 360, and bridge 380 of the transmission 130. The window frame 160 extends through the apertures 420 in the bridge 380, such that the center portion of the bridge 380 extends through the window 170. The vertical slots 195 in the hinge 120 are formed around the anchors 350, 360. The shoulders 410 of the anchors 350, 360 are completely covered with plastic of the cross-bar 140. Overmolding the hinge 120 on the transmission 130 mechanically bonds the two components to obviate the multipiece assembly and manufacturing process of known drives.

Material selection for the hinge 120 and transmission 130 involves selecting materials that have good flexibility and fatigue resistance for the hinge 120 and relatively high strength and rigidity for the transmission 130. At the same time, the materials should have substantially similar melting points so that they can be molded in the same die at the same mold temperature. In a preferred embodiment, the hinge 120 is made of polypropylene, which is a good material for living hinges, and the transmission 130 is made of glass-filled polypropylene. Polypropylene and glass-filled polypropylene are made from the same resin or a very similar resin, and have a similar melting temperature of about 450° F. In one example, a mold temperature of a approximately 130° F. can be used for both polypropylene and glass-filled polypropylene. But glass-filled polypropylene is stiffer than polypropylene and therefore suitable for use as the transmission 130.

Thus, the invention provides, among other things, a drive member for a trimmer, the drive member including a hinge and a transmission that are created through a two-shot injection molding process. Various features and advantages of the invention are set forth in the following claims.

What is claimed is:

1. A drive configured to connect a rotary drive to a hair cutting head assembly comprising:
   a transmission having a bridge member disposed between a cam follower and a drive lever, wherein the bridge member defines a pair of apertures; and
   a hinge having opposing side supports, a cross-bar, and a plurality of webs that connect the side supports to the cross-bar, wherein a portion of the cross-bar encapsulates a portion of the bridge member to fasten the transmission and the hinge, wherein the portion of the cross-bar is received by the apertures to encapsulate the portion of the bridge member.

2. The drive of claim 1, wherein the bridge member connects the cam follower to the drive lever.

3. The drive of claim 1, wherein the pair of apertures are disposed on opposing sides of the bridge member.

4. The drive of claim 3, wherein the portion of the cross-bar is received by the apertures to encapsulate the bridge member.

5. The drive of claim 1, wherein the hinge is made of a first material and the transmission is made of a second material.

6. The drive of claim 5, wherein the first material is different than the second material.

7. The drive of claim 6, wherein the second material has a stiffness that is greater than the first material.

* * * * *